(12) United States Patent
Liu

(10) Patent No.: US 8,545,079 B2
(45) Date of Patent: Oct. 1, 2013

(54) LIGHT PIPE AND HOUSING ASSEMBLY USING THE SAME

(75) Inventor: Zhi-Hua Liu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 164 days.

(21) Appl. No.: 13/302,105

(22) Filed: Nov. 22, 2011

(65) Prior Publication Data

US 2013/0033890 A1  Feb. 7, 2013

(30) Foreign Application Priority Data

Aug. 4, 2011 (CN) .......................... 2011 10 2224605

(51) Int. Cl.
*A41F 1/00* (2006.01)

(52) U.S. Cl.
USPC ........................... 362/581; 362/551; 362/576

(58) Field of Classification Search
USPC .......................................... 362/581, 551, 576
See application file for complete search history.

(56) References Cited

U.S. PATENT DOCUMENTS

| 7,186,012 B2 * | 3/2007 | Schevardo et al. ............ 362/555 |
| 2002/0176260 A1 * | 11/2002 | Liao .............................. 362/551 |
| 2012/0243253 A1 * | 9/2012 | Claprood et al. ............. 362/555 |

FOREIGN PATENT DOCUMENTS

CN  101840659 A  9/2010

* cited by examiner

*Primary Examiner* — Evan Dzierzynski
(74) *Attorney, Agent, or Firm* — Altis & Wispro Law Group, Inc.

(57) ABSTRACT

A light pipe includes a light guiding body and a light shielding. The light guiding body comprises an installing portion, a light incident portion, and a light emitting portion. The light incident portion and the light emitting portion oppositely formed in the two opposite ends of the installing portion. A light shielding member is made of pliable material, and fits over a side surface of the installing portion, an end surface of the installing portion adjoining the light emitting portion, and a side surface of the light emitting portion.

13 Claims, 5 Drawing Sheets

LIGHT PIPE AND HOUSING ASSEMBLY USING THE SAME

BACKGROUND

1. Technical Field

The present disclosure relates generally to a light pipe and a housing assembly using the light pipe.

2. Description of Related Art

Light pipes are often assembled within a housing to guide light from one point such as a light emitting diode (LED) on a printed circuit board (PCB) to another point such as an indicator on a surface of the housing. Many light pipes are made of transparent resins. Usually some parts of an outer surface of a light pipe need to be coated with a shielding film by an electroplating or a painting process. However, the light pipe may be very small, and this makes it difficult to accurately apply the shielding film. Such difficulties can adversely affect the cost and quality of production.

Therefore, there is room for improvement within the art.

BRIEF DESCRIPTION OF THE DRAWINGS

The elements in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
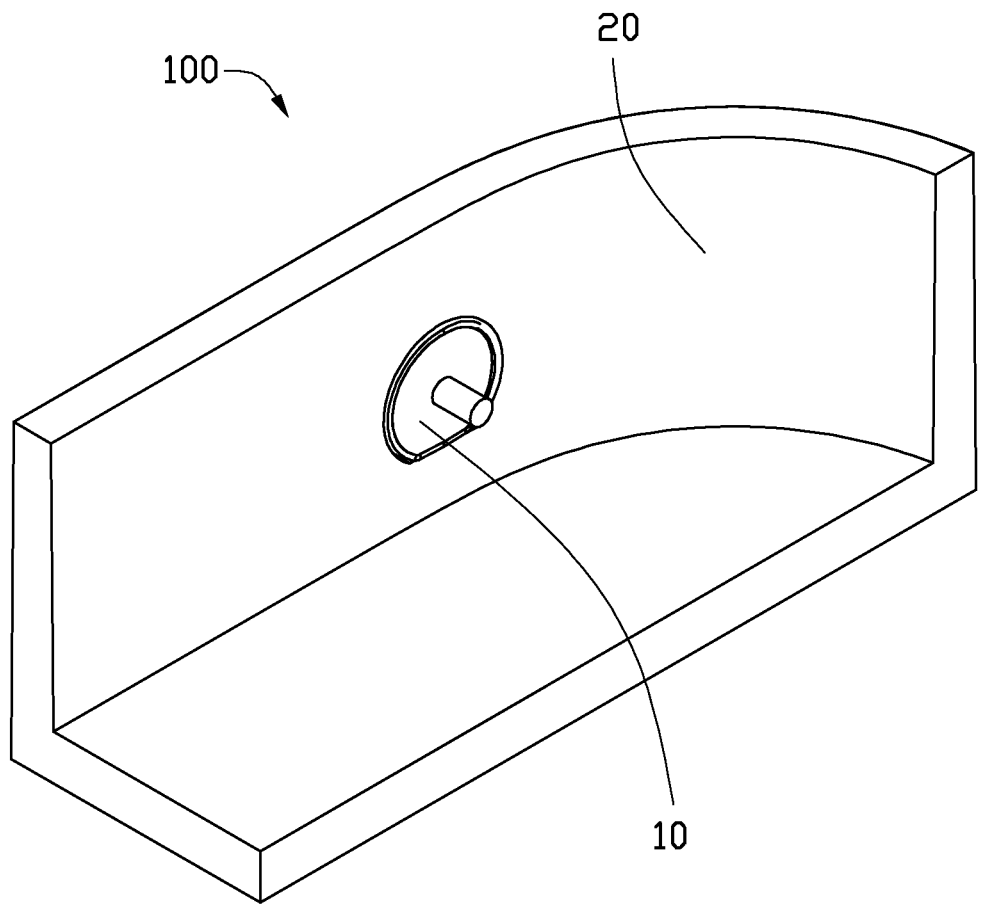
FIG. 1 is an isometric view of part of an embodiment of a housing assembly with a light pipe.
Figure 2:
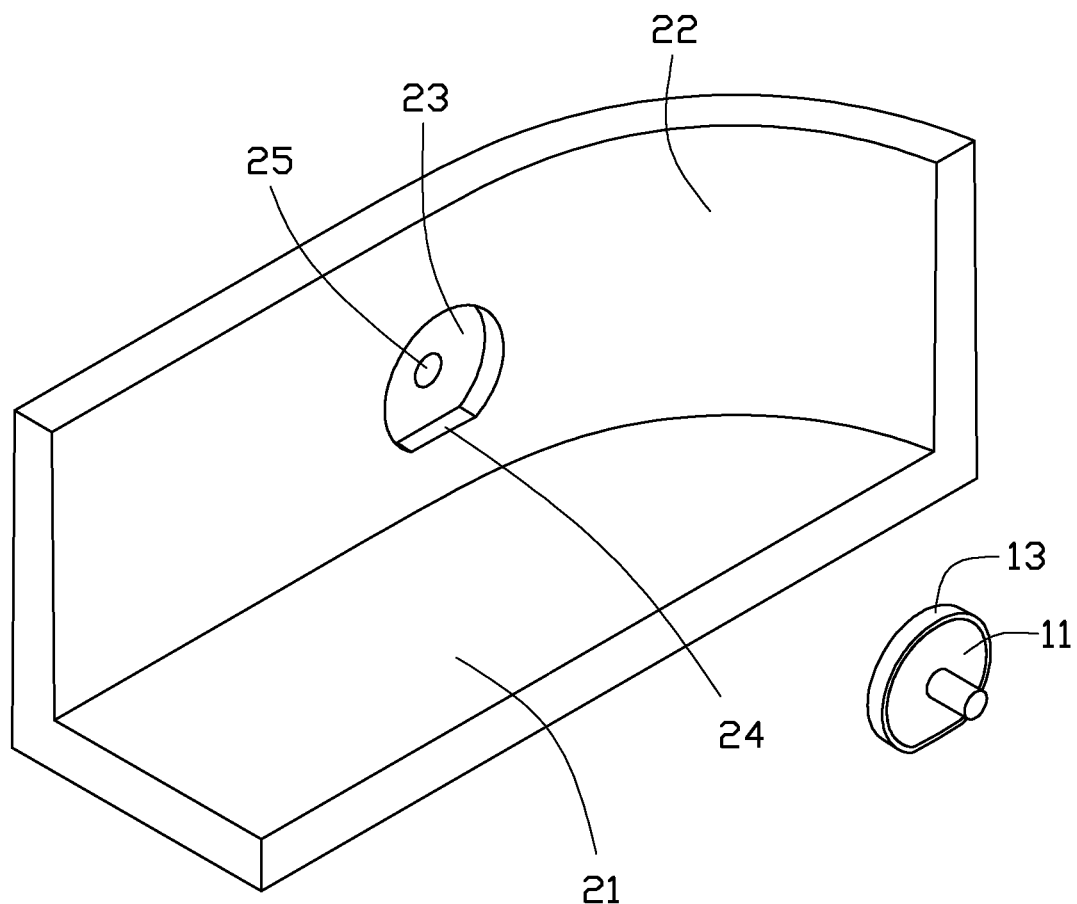
FIG. 2 is an exploded view of the housing assembly of FIG. 1.

Referring to FIG. 1 and FIG. 2, an embodiment of a housing assembly 100 includes a housing 20 and a light pipe 10 mounted in the housing 20.

The housing 20 includes a base 21 and a sidewall 22. The sidewall 22 substantially perpendicularly extends from the edge of the base 21. The sidewall 22 forms a mounting trough 23 at an inside thereof, to receive the light pipe 10. In the illustrated embodiment, the mounting trough 23 is generally disk-shaped. A straight guiding part 24 is formed in a bottom wall of the mounting trough 23, to guide the installation of the light pipe 10. The sidewall 22 further includes a light guiding hole 25, defined at substantially a center of the mounting trough 23.

The light pipe 10 is detachably installed in the housing 20. The light pipe 10 includes a light guiding body 11 and a light shielding member 13. The light shielding member 13 fits over a part of an outer surface of the light guiding body 11.

Figure 3:
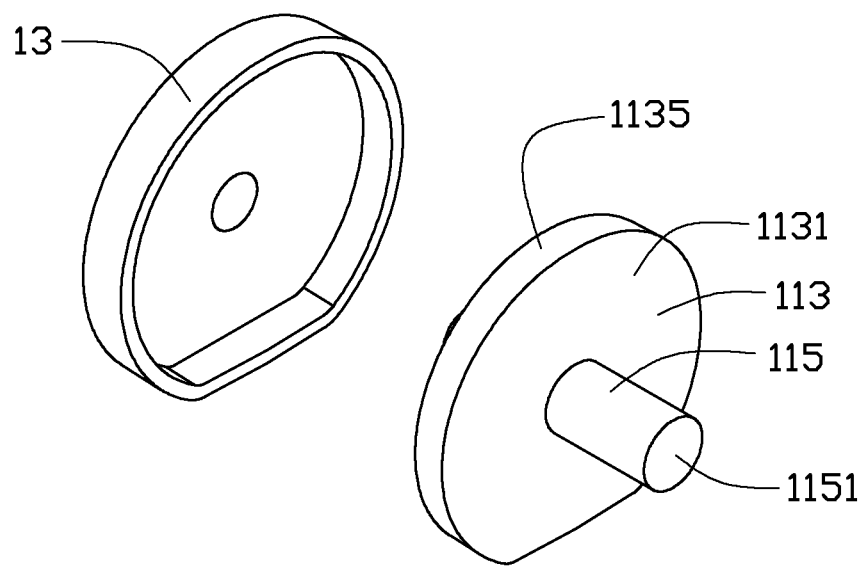
FIG. 3 is a an enlarged, exploded view of the light pipe of FIG. 2.
Figure 4:
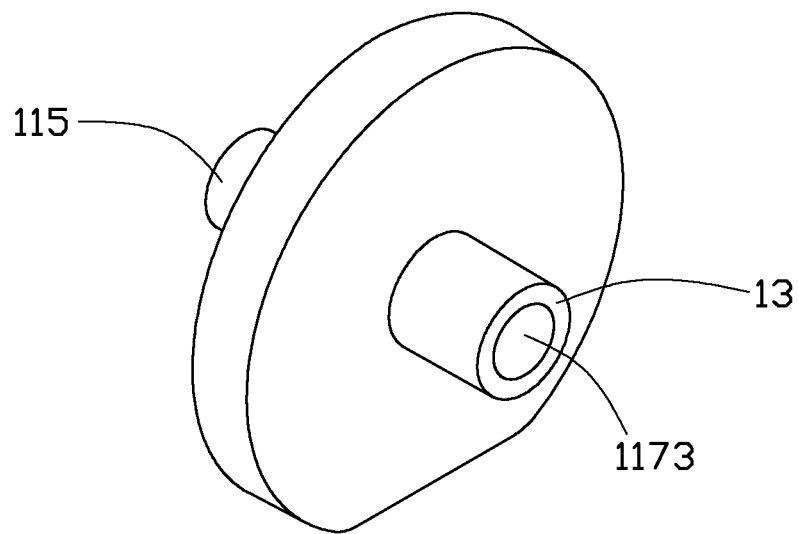
FIG. 4 is an isometric view of the light pipe of FIG. 3, but showing the light pipe assembled and reversed.
Figure 5:
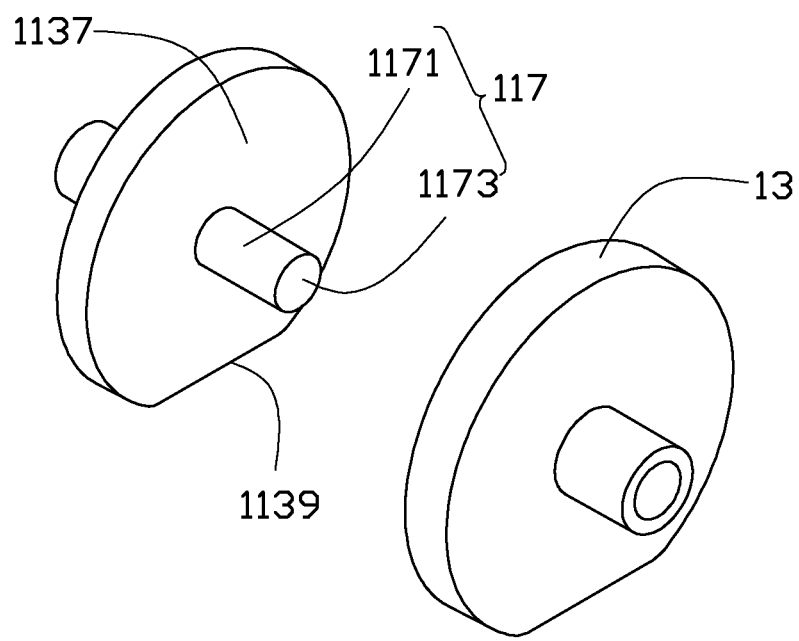
FIG. 5 is an exploded view of the light pipe of FIG. 4.

Referring also to FIG. 3 through FIG. 5, the light guiding body 11 includes an installing portion 113, a light incident portion 115, and a light emitting portion 117. The light incident portion 115 and the light emitting portion 117 are located at two opposite sides of the installing portion 113. The installing portion 113 is shaped to fit in the light shielding member 13, which in turn is shaped to fit in the mounting trough 23. That is, the installing portion 113 is assembled together with the light shielding member 13 to form the light pipe 10, and the light pipe 10 is received in the mounting trough 23. The installing portion 113 is disk-like, with a first flat surface 1131 and a second flat surface 1137 at opposite sides thereof, and a peripheral surface 1135 between the first and second flat surfaces 1131, 1137. The installing portion 113 further defines a locating part 1139 on the peripheral surface 1135, corresponding to the guiding part 24 of the housing 20. The locating part 1139 together with a corresponding portion of the light shielding member 13 facilitate guiding of the light pipe 10 into the mounting trough 23.

The light incident portion 115, the light emitting portion 117, and the installing portion 113 are coaxial. The light incident portion 115 is formed at a center of the first flat surface 1131. A light incident surface 1151 is defined on an end of the light incident portion 115 away from the installing portion 113, for receiving light from a source such as an LED. The light emitting portion 117 is formed at a center of the second flat surface 1137, for emitting the light. The light emitting portion 117 can be received in the light guiding hole 25. The light emitting portion 117 can be cylindrical, square and so on. In the illustrated embodiment, the light emitting portion 117 is cylindrical. The light emitting portion 117 includes an outer side surface 1171 and a light emitting surface 1173. The light emitting surface 1173 is an end surface of the light emitting portion 117 away from the installing portion 113. The light guiding body 11 is made of one or more transparent resins selected from the group including polyacrylic acid (PAA), polycarbonate (PC), polystyrene (PS), polymethyl methacrylate (PMMA), and methylmethacrylate and styrene (MS). In the present embodiment, the light guiding body 11 is a single, one-piece, monolithic body of the one same material without any internal seams.

The light shielding member 13 fits over the peripheral surface 1135, the second flat surface 1137 of the installing portion 113, and the outer side surface 1171 of the light emitting portion 117, to stop light from escaping from the light guiding body 11 and scattering. The light shielding member 13 is made of pliable material which can stop light from escaping and scattering, such as rubber, polystyrene, or polyurethane. The light shielding member 13 is formed by injection molding. In the present embodiment, the light shielding member 13 is a single, one-piece, monolithic body of the one same material without any internal seams. In further or alternative embodiments, the light shielding member 13 can be configured to cover or encase other surfaces of the light guiding body 11 as needed.

In assembly, the light emitting portion 1171 is put into the light guiding hole 25, using the guiding part 24 as a guide. At the same time, a peripheral portion of the light shielding member 13 corresponding to the installing portion 113 is friction fitted in the mounting trough 23.

Light enters the light pipe 10 via the light incident surface 1151, and then emits from the light pipe 10 via the light emitting surface 1173.

The light shielding member 13 of the light pipe 10 is made of pliable material, and covers or encases the outer side surface 1171 of the light emitting portion 117, and the peripheral surface 1135 and the flat surface 1137 of the installing portion 113. The cost of manufacturing of the light pipe 10 is lower than the light pipes made by the electroplating or painting process. In addition, due to the pliable characteristic of the material of the light shielding member 13, the light pipe 10 can be closely fitted in the mounting trough 23 and the light guiding hole 25 substantially without any gaps.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A light pipe, comprising:
a light guiding body comprising:
an installing portion,
a light incident portion, and
a light emitting portion, the light incident portion and the light emitting portion located at two opposite sides of the installing portion; and
a light shielding member made of pliable material, the light shielding member fitted over a side surface of the installing portion, an end surface of the installing portion adjacent to the light emitting portion, and a side surface of the light emitting portion.

2. The light pipe of claim 1, wherein the installing portion is disk-like.

3. The light pipe of claim 2, wherein the installing portion includes a first flat surface, a second flat surface and a peripheral surface, the first flat surface is opposite to the second flat surface, the peripheral surface connects the first flat surface and the second flat surface, the second flat surface adjoins the light emitting portion, the peripheral surface is an outer periphery of the installing portion.

4. The light pipe of claim 3, wherein the light incident portion is formed in a center of the first flat surface, the light emitting portion is formed in a center of the second flat surface.

5. The light pipe of claim 1, wherein an light incident face is positioned on an end of the light incident portion away from the installing portion.

6. The light pipe of claim 1, wherein the light emitting portion further includes an light emitting surface formed in an end surface of the light emitting portion away from the installing portion.

7. The light pipe of claim 1, wherein the light shielding member is made of rubber.

8. A housing assembly comprising:
a housing; and
a light pipe mounted in a wall of the housing, the light pipe comprising:
a light guiding body comprising:
an installing portion,
a light incident portion, and
a light emitting portion, the light incident portion and the light emitting portion located at two opposite sides of the installing portion; and
a light shielding member made of pliable material, the light shielding member fitted over a side surface of the installing portion, an end surface of the installing portion adjacent to the light emitting portion, and a side surface of the light emitting portion.

9. The housing assembly of claim 8, wherein the housing includes a light guiding hole, the light emitting portion is mounted in the light guiding hole.

10. The housing assembly of claim 9, wherein the housing further forms a mounting trough, the light guiding hole is defined in a substantially center of a bottom surface of the mounting trough, the installing portion of the light pipe is received within the mounting trough.

11. The housing assembly of claim 10, wherein a guiding part is formed in a round edge of the mounting trough.

12. The housing assembly of claim 11, wherein a locating part is configured in a round surface for guiding the installation of the light pipe, corresponding to the guiding part of the housing.

13. A light pipe, comprising:
a one-piece monolithic light guiding body comprising:
an installing portion,
a light incident portion, and
a light emitting portion, the light incident portion and the light emitting portion located at two opposite sides of the installing portion and coaxial with each other; and
a one-piece monolithic light shielding member made of pliable material, the light shielding member encasing a circumferential side surface of the installing portion, an end surface of the installing portion adjoining the light emitting portion, and a circumferential side surface of the light emitting portion.

* * * * *